(12) United States Patent
Vecera et al.

(10) Patent No.: US 10,345,967 B2
(45) Date of Patent: Jul. 9, 2019

(54) USER INTERFACE FOR A DEVICE

(71) Applicant: Red Hat, Inc., Raleigh, NC (US)

(72) Inventors: Martin Vecera, Brno (CZ); Jiri Pechanec, Mokra-Horakov (CZ)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 14/489,048

(22) Filed: Sep. 17, 2014

(65) Prior Publication Data

US 2016/0077627 A1   Mar. 17, 2016

(51) Int. Cl.
| | |
|---|---|
| G06F 3/044 | (2006.01) |
| G06F 3/0488 | (2013.01) |
| G06F 3/01 | (2006.01) |
| G06F 3/0485 | (2013.01) |
| G06F 3/0484 | (2013.01) |

(52) U.S. Cl.
CPC .............. G06F 3/044 (2013.01); G06F 3/017 (2013.01); G06F 3/0485 (2013.01); G06F 3/04847 (2013.01); G06F 3/04883 (2013.01); G06F 2203/0339 (2013.01); G06F 2203/04101 (2013.01); G06F 2203/04104 (2013.01)

(58) Field of Classification Search
None
See application file for complete search history.

(56) References Cited

U.S. PATENT DOCUMENTS

| | | | |
|---|---|---|---|
| 7,800,592 B2 | 9/2010 | Kerr et al. | |
| 8,712,478 B2 | 4/2014 | Inami | |
| 2005/0012723 A1* | 1/2005 | Pallakoff | G06F 1/1616 345/173 |
| 2007/0103454 A1 | 5/2007 | Elias | |
| 2009/0219255 A1* | 9/2009 | Woolley | G06F 3/0416 345/173 |
| 2009/0299743 A1* | 12/2009 | Rogers | H04M 1/274516 704/235 |
| 2010/0085317 A1* | 4/2010 | Park | G06F 1/1626 345/173 |
| 2010/0134423 A1* | 6/2010 | Brisebois | G06F 3/03547 345/173 |
| 2010/0194705 A1 | 8/2010 | Kim et al. | |

(Continued)

OTHER PUBLICATIONS

Gavin Munro, Dual-Touch Smartphone Design Concept, May 30, 2014, http://efergy.com/blog/dual-touch-smartphone-design-concept/.

(Continued)

Primary Examiner — Lunyi Lao
Assistant Examiner — Benjamin X Casarez
(74) Attorney, Agent, or Firm — Haynes and Boone LLP

(57) ABSTRACT

A device includes a processor and a memory comprising machine readable instructions that when executed by the processor, cause the system to display information to a user through a display screen of the device, the display screen being positioned on a front side of the device, receive a first input from a first sensor placed on a left side of the device, the first input indicating a placement of at least one appendage along the first sensor, receive a second input from a second sensor placed on a right side of the device, the second input indicating a placement of at least one appendage along the second sensor, and execute a predefined function within an application running on the device, the predefined function being based on both the first input and the second input.

17 Claims, 5 Drawing Sheets

(56) References Cited

U.S. PATENT DOCUMENTS

| | | | | |
|---|---|---|---|---|
| 2010/0287470 | A1* | 11/2010 | Homma | G06F 3/03547 715/702 |
| 2011/0057957 | A1* | 3/2011 | Kasahara | G06F 1/1626 345/684 |
| 2011/0087963 | A1* | 4/2011 | Brisebois | G06F 3/0485 715/702 |
| 2011/0312349 | A1* | 12/2011 | Forutanpour | G06F 1/1626 455/466 |
| 2012/0212445 | A1 | 8/2012 | Heikkinen et al. | |
| 2012/0270605 | A1* | 10/2012 | Garrone | H04M 1/72563 455/566 |
| 2012/0274600 | A1* | 11/2012 | Yeung | G06F 3/03547 345/174 |
| 2013/0076796 | A1* | 3/2013 | Hayashi | G06F 3/0354 345/661 |
| 2013/0215060 | A1* | 8/2013 | Nakamura | G06F 1/1626 345/173 |
| 2013/0271419 | A1* | 10/2013 | Sharma | G06F 3/03 345/173 |
| 2013/0300668 | A1 | 11/2013 | Churikov et al. | |
| 2014/0078073 | A1* | 3/2014 | Gan | G06F 1/169 345/173 |
| 2014/0078086 | A1* | 3/2014 | Bledsoe | G06F 3/041 345/173 |
| 2014/0123003 | A1* | 5/2014 | Song | G06F 1/1626 715/701 |
| 2014/0139443 | A1 | 5/2014 | Kao et al. | |
| 2014/0189551 | A1* | 7/2014 | Kim | G06F 3/04817 715/765 |
| 2014/0223358 | A1* | 8/2014 | Park | G06F 3/0488 715/786 |
| 2014/0320420 | A1* | 10/2014 | Ida | G06F 3/044 345/173 |
| 2015/0054774 | A1* | 2/2015 | Fergusson | G01B 7/14 345/174 |
| 2015/0192989 | A1* | 7/2015 | Kim | G06F 3/011 345/156 |
| 2015/0205400 | A1* | 7/2015 | Hwang | G06F 3/044 345/654 |
| 2015/0261347 | A1* | 9/2015 | Sugita | G06F 3/044 345/174 |
| 2016/0026309 | A1* | 1/2016 | Wu | G09G 5/346 345/174 |
| 2016/0266652 | A1* | 9/2016 | Son | G06F 3/01 |
| 2016/0291731 | A1* | 10/2016 | Liu | G06F 1/1656 |
| 2017/0003796 | A1* | 1/2017 | Kono | G06F 3/0485 |

OTHER PUBLICATIONS

Chuong Nguyen, Google May Add Touch Gestures to Rear of Phones, Mar. 11, 2013, http://www.gottabemobile.com/tag/touch/.

Takashi Miyaki et al., Grasp Zoom: Zooming and Scrolling Control Model for Single-Handed Mobile Interaction, Sep. 15-18, 2009, http://www.researchgate.net/publication/221271014_GraspZoom_zooming_and_scrolling_control_model_for_single-handed_mobile_interaction.

Jack Purcher, LG Reveals a Future Smartphone with a Multifunctional Backside Control Button, Jan. 10, 2014, http://www.patentlymobile.com/patent-bolt/2014/01/lg-reveals-a-future-smartphone-with-a-multifunctional-backside-control-button.html#more.

Tayfur Coskun et al., Gestyboard Back Touch 1.0: Two-Handed Backside Blind-Typing on Mobile Touch-Sensitive Surfaces, 2013, http://ar.in.tum.de/pub/coskun2013GestyboardBacktouch_Mobiguitous%202013/coskun2013GestyboardBacktouch_Mobiquitous%202013.pdf.

* cited by examiner

USER INTERFACE FOR A DEVICE

BACKGROUND

The present disclosure relates generally to a computing devices, and more particularly to methods and systems for human interaction with a computing device.

The use of mobile computing devices such as smartphones and tablet devices has increased. Such mobile computing devices offer a variety of mechanisms that allow human users to interact with the devices. For example, such devices typically include a touchscreen that both displays information to a user and receives input from the user. Some devices also have physical buttons that allow the user to perform various functions with the device such as to raise or lower volume, or power the device on and off.

When using a mobile computing device such as a mobile phone for a communication session such as a phone call, the user generally holds the device up to his or her ear. Thus, when the user desires to interact with the phone in a certain manner, the user has to pull the device away from his or her ear in order to look at the touchscreen and provide the appropriate input into the touchscreen. It is desirable to find ways to improve the manner in which users interact with such mobile computing devices.

SUMMARY

A device includes a processor and a memory comprising machine readable instructions that when executed by the processor, cause the system to display information to a user through a display screen of the device, the display screen being positioned on a front side of the device, receive a first input from a first sensor placed on a left side of the device, the first input indicating a placement of at least one appendage along the first sensor, receive a second input from a second sensor placed on a right side of the device, the second input indicating a placement of at least one appendage along the second sensor, and execute a predefined function within an application running on the device, the predefined function being based on both the first input and the second input.

A mobile device includes a display screen on a front side of the device, a left side sensor on a left side of the device, a right side sensor on a right side of the device, a processor, and a memory comprising machine readable instructions that when executed by the processor, cause the device to display information to a user through the display screen of the device, receive a first input from the left side sensor, the first input indicating a placement of at least one appendage along the left side sensor, receive a second input from the right side sensor, the second input indicating a placement of at least one appendage along the right side sensor, and execute a predefined function within an application running on the device, the predefined function being based on both the first input and the second input.

A method performed by a mobile computing device includes receiving a first input from a first sensor placed on a left side of the device, the first input indicating a placement of at least one appendage along the first sensor, receiving a second input from a second sensor placed on a right side of the device, the second input indicating a placement of at least one appendage along the second sensor, and executing a predefined function within an application running on the device, the predefined function being based on both the first input and the second input.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to improve the manner in which people interact with mobile computing devices. According to one example of principles described herein, a mobile computing device includes one or more sensors, apart from a touchscreen, that can detect finger or hand positions as a user holds the device. Additionally, the one or more sensors can detect hand or finger gestures. Appendage positions can be used to cause applications running on the mobile device to perform various functions. For example, when a user switches the manner in which he or she holds the device, this can signal to a communication application to terminate a call. Hand and finger motions and gestures can also be used to perform other functions. For example, certain motions of the hands or fingers can signal the communication application to raise or lower the volume during a call. The following provides more detail and additional examples of how additional sensors, apart from the touchscreen, can be used to provide improved interaction with a mobile computing device.

Figure 1A:
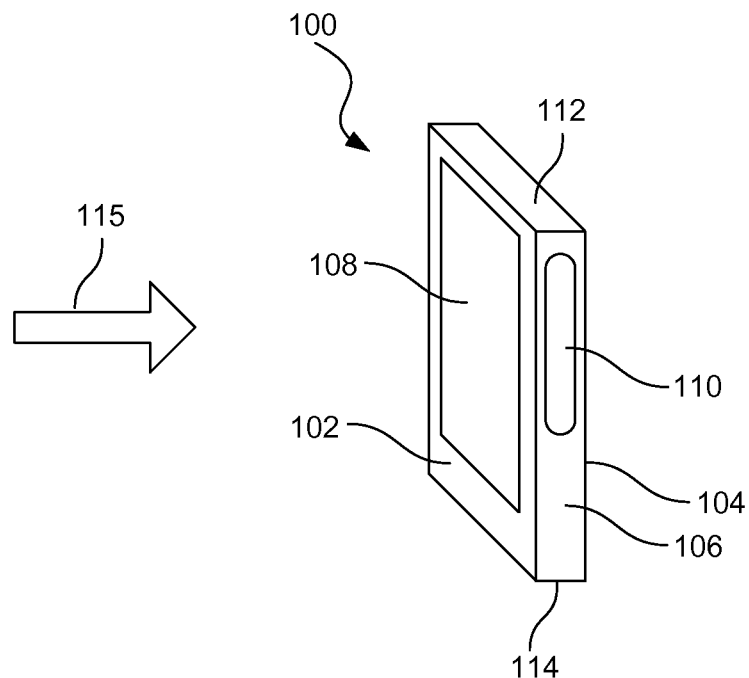
FIGS. 1A and 1B are diagrams showing an illustrative mobile computing device with a sensor to detect appendage position and/or gestures, according to one example of principles described herein.
Figure 1B:
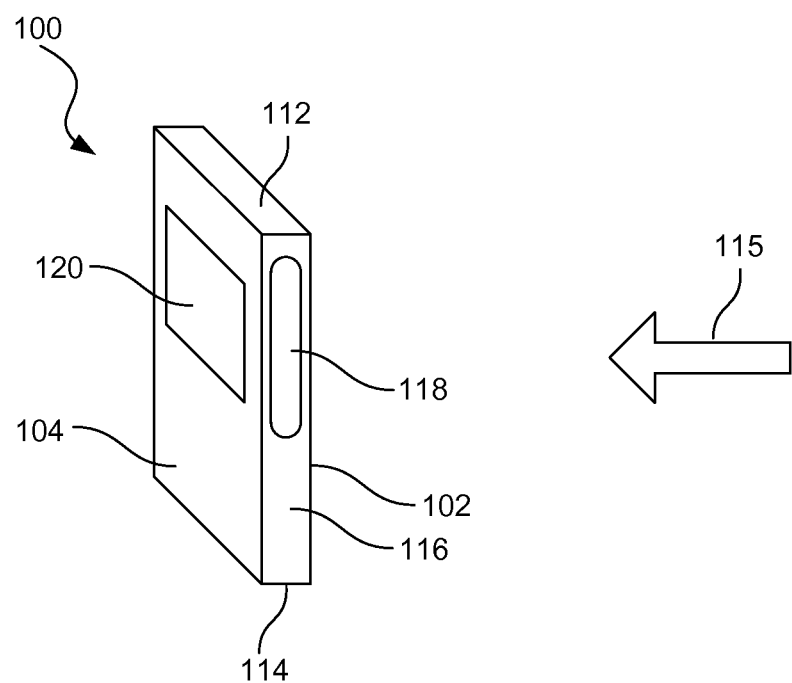

FIGS. 1A and 1B are diagrams showing an illustrative mobile computing device with a sensor to detect appendage position and/or gestures. FIG. 1A is a perspective view of the mobile computing device 100 that shows a front side 102 of the mobile computing device 100. FIG. 1B is a perspective view that shows a back side 104 of the mobile computing device 100.

The mobile computing device 100 may be, for example, a cellular phone such as a smartphone. The examples described herein will generally refer to the case in which the mobile computing device is a communication device such as a smartphone. But, the principles described herein may apply to other types of computing devices such standard cellular phones, tablet devices, and other computing devices.

The mobile computing device 100 includes a front side 102, a back side 104, a right side 106, a left side 116, a top side 112, and a bottom side 114. The terms used to describe the different sides of the mobile computing device 100 are in accordance with a perspective from which a user typically views the device. Such a perspective is shown by arrow 115. Specifically, a user typically views the mobile computing 100 device by looking at a touchscreen 108 on the front of the device.

The touchscreen 108 both displays information to a user and receives information from the user. For example, the touchscreen may include a light emitting diode (LED) display as well as a capacitive sensor array. The capacitive sensor array can determine where, along the touchscreen 108, a user touches. Conventional mobile computing devices provide a graphical user interface with the touchscreen through which the user activates various functions of an application. For example, the user interacts with the touchscreen to initiate a phone call. During a phone call, the user typically holds the device up to his or her ear and thus cannot see or interact with the touchscreen 108.

According to principles described herein, the device includes one or more additional sensors 110, 118 on other sides of the mobile computing device 100. The user may thus interact with the mobile computing device 100 using these sensors 110, 118 to send commands to the mobile computing device 100. These commands may be sent even while the user is holding the mobile computing device 100 up to his or her face.

In one example, a right side sensor 110 is placed on the right side 106 of the device. The plane of the right side 106 of the device is substantially perpendicular to the front plane of the device. The right side 106 may be flat, rounded, or curved. The right side sensor 110 may match the contour of the right side 106. For example, if the right side 106 is rounded, then the right side sensor 110 may be rounded as well. While the right side sensor 110 is illustrated as being disposed along a portion of the right side 106, in some examples, the right side sensor 110 may cover the entire right side 106.

In one example, the sensor 110 is a capacitive sensor. A capacitive sensor may be configured to sense the capacitance of a human finger that is in direct contact with the sensor 110. Alternatively, a capacitive sensor can be configured to sense a human finger that is in proximity to the sensor 110 but not necessarily in direct contact with the sensor 110. The capacitive sensor may also sense other objects that have similar electrical properties of a human finger. For example, a stylus may be designed with such a property. The distance at which the proximity can sense a human hand, finger, or thumb depends on how the sensor is calibrated.

The right side sensor 110 can be used to sense the manner in which a user is holding the mobile computing device 100. For example, if a user is holding the mobile computing device 100 with his or her right hand, then the user's thumb will be typically be placed somewhere along the right side 106. The right side sensor 110 can determine the exact location of the user's thumb. If a user holds the mobile computing device 100 with his or her left hand, then at least one or all of the user's fingers may be placed somewhere along the right side 106. The right side sensor 110 can determine how many fingers are placed along the right side and the exact position of those fingers.

The different manners in which a user may hold the computing device 100 can signal different commands to an application running on the device. For example, if a communication application is running, such as one to make a phone call, then different hand holding configurations can be used to mute the conversation, raise the volume, lower the volume, terminate the call or other in-call functions. In some example, a change in the way in which a user holds the mobile computing device 100 can signal a command. For example, if the user has all three fingers in contact with the mobile computing device 100, and then removes the fourth finger, then this can signal a command to mute the conversation.

FIG. 1B illustrates the back side 104 of the device. The plane of the back side 104 is parallel to and opposite the plane of the front side 104. The back side 104 may also be flat, rounded, or curved. The back side 104 of the mobile computing device 100 may also include a sensor 120. The contour of the sensor 120 may match the contour of the back side 104. While the back sensor 120 is illustrated as being disposed along a portion of the back side 104, in some examples, the back sensor 120 may cover the entire back side 104. The back sensor 110 may also be a capacitive sensor. Other type of touch sensors, such as pressure sensors, may be used as well.

The back sensor 120 can also be used to determine how a user is holding the mobile computing device 120. For example, the user may place his or her index finger somewhere on the back side 104 of the mobile computing device 100. The position at which the index finger is placed may signal specific commands to the application running on the mobile computing device 100. Additionally, as will be described in further detail below, certain movements of the index finger along the sensor 120 may signal specific commands to an application running on the device.

The left side 116 may also include a left side sensor 118. The left side sensor 118 may operate in a manner similar to the right side sensor 110. The plane of the left side 116 of the device is substantially perpendicular to the plane of the front side 102 of the mobile computing device 100. The plane of the left side 116 is also parallel to and opposite the plane of the right side 106 of the mobile computing device 100. The left side 116 may be flat, rounded, or curved. The sensor 118 may match the contour of the left side 116. While the left side sensor 118 is illustrated as being disposed along a portion of the left side 116, in some examples, the left side sensor 118 may cover the entire left side 106. In one example, the left side sensor 118 is a capacitive sensor.

The left side sensor 118 can be used to help sense the manner in which a user is holding the mobile computing device 100. For example, if a user is holding the mobile computing device 100 with his or her right hand, then the user's fingers will be typically be placed somewhere along the left side 116. The left side sensor 118 can determine the exact location of the user's fingers. If a user holds the mobile computing device 100 with his or her right hand, then the user's thumbs may be placed somewhere along the left side 116. The left side sensor 118 can determine the location of the user's thumb along the left side 116.

The mobile computing device 100 also includes a top side 112. The plane of the top side 112 is substantially perpendicular to both the plane of the front side 102 and the plane of either the left side 116 or the right side 106. In some examples, sensors (not shown) may be placed along the top side 112. Such sensors can also help determine the manner in which the mobile computing device 100 is being held, as well as detect movement or gestures along the top side 112.

The mobile computing device 100 also includes a bottom side 114. The plane of the bottom side 114 is substantially perpendicular to both the plane of the front side 102 and the plane of either the left side 116 or the right side 106. In some examples, sensors (not shown) may be placed along the bottom side 114. Such sensors can also help determine the manner in which the mobile computing device 100 is being held, as well as detect movement or gestures along the bottom side 114.

While FIGS. 1A and 1B illustrate a single sensor on a particular side, it is understood that in some examples, a particular side may have multiple sensors. For example, there may be an array of sensors positioned along the back side 104 or along either side 106, 116 of the mobile computing device. Multiple sensors may act in concert to detect appendage position as well as motions and gestures made by the hands or fingers.

Figure 2:
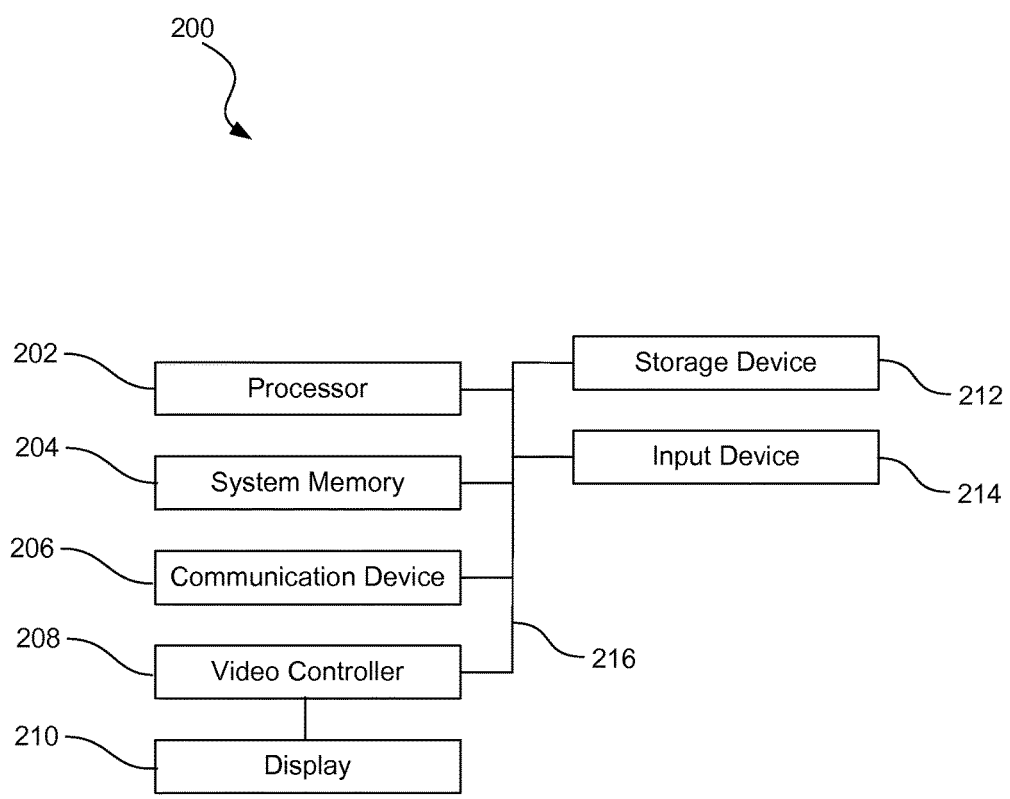
FIG. 2 is a diagram showing illustrative components of a mobile computing system that has a sensor to detect appendage position and/or gestures, according to one example of principles described herein.

FIG. 2 is a diagram showing illustrative components of a computing system 200 that includes additional sensors for improved user interaction. For example, the computing system 200 may correspond to the mobile computing device 100 of FIG. 1. According to the present example, the computing system 200 includes a processor 202, an input device 214, a storage device 212, a video controller 208, a system memory 204, a display 210, and a communication device 206, all of which are interconnected by one or more buses 216.

The storage device 212 may include a computer readable medium that can store data. The storage device 212 may include volatile memory storage devices such as Random Access Memory (RAM) as well as non-volatile memory storage devices such as solid state memory components. The computer readable medium may be a non-transitory tangible media.

In some examples, the communication device 206 may include an antenna for connecting with remote networks such as 3G or 4G data networks. The communication device 216 may also be configured to communicate over a cellular phone network. The communication device 206 may also include other mechanisms for connecting the mobile computing device to other devices.

A computing system such as the computing system 200 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as ORACLE, MICROSOFT ACCESS, SYBASE, or DBASE II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 204, and/or any combination thereof, may be executed by a processor 202 to cause the processor 202 to carry out or implement in whole or in part the operation of the computing system 200, one or more of the methods. In some examples, such a processor 202 may execute the plurality of instructions in connection with a virtual computer system.

The display 210 may include the display aspect of a touchscreen such as the touchscreen 108 in FIG. 1. As described above, a touchscreen also has an input component. Thus, the input device 214 can include the input component of the touchscreen 108. The input device 214 also includes any sensors placed on additional sides of a mobile computing device.

Figure 3A:
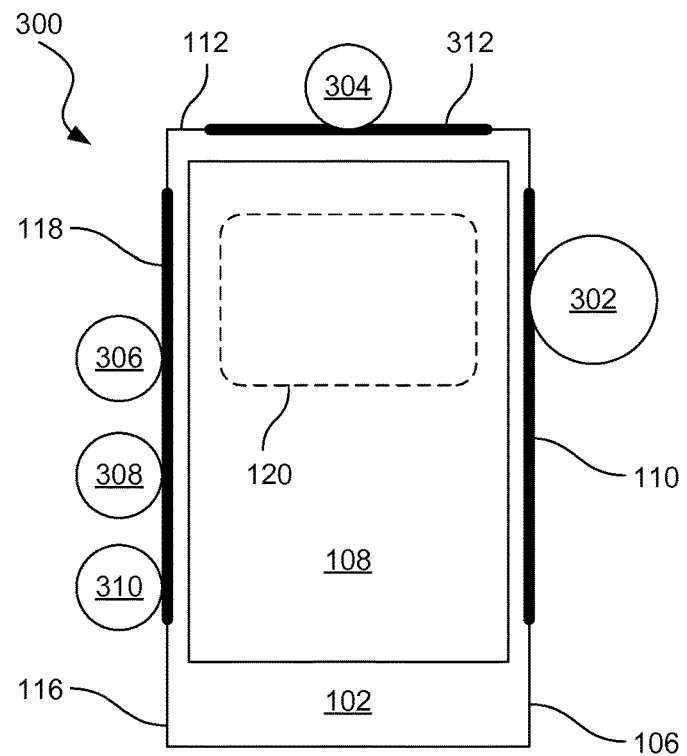
FIGS. 3A and 3B are diagrams showing illustrative finger placement on a mobile computing device, according to one example of principles described herein.
Figure 3B:
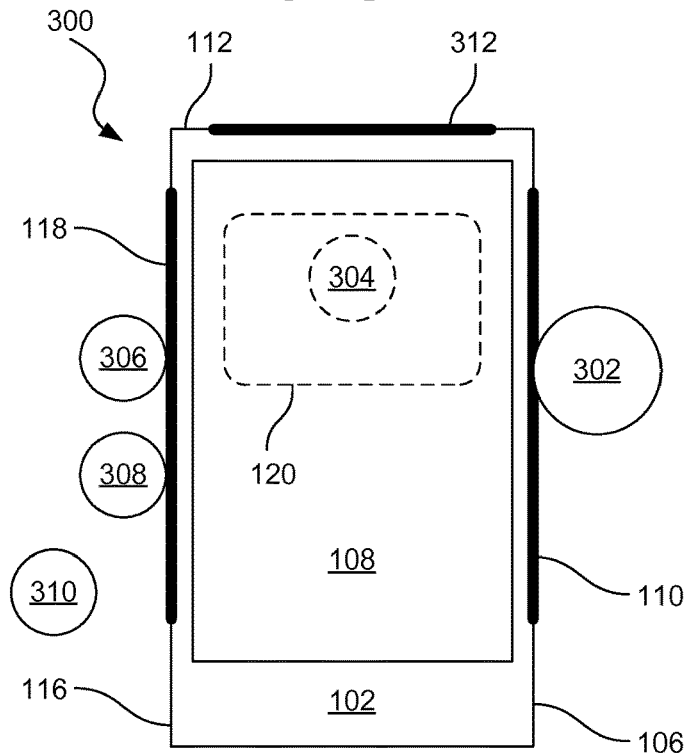

FIGS. 3A and 3B are diagrams showing illustrative appendage placement along sensors of a mobile computing device 300. Appendages may include fingers, thumbs, or other parts of a hand. FIG. 3A illustrates a first appendage positioning and FIG. 3B illustrates a second appendage positioning. Both FIGS. 3A and 3B are views of a mobile computing device 300 of the front side 102 and thus the main display or touchscreen 108 is shown. The mobile computing device 300 includes a left side sensor 118 on the left side 116 and a right side sensor 110 on the right side 106. The mobile computing device 300 also includes a back sensor 120 on the back side of the device. The mobile computing device 300 also includes a top sensor 312 on the top side 112 of the device. It is understood that the mobile device 300 illustrated in FIGS. 3A and 3B is one example of a mobile computing device that can be used in accordance with principles described herein. Other configurations of mobile computing devices may be used as well.

According to the example of FIG. 3A, a user is holding the mobile computing device 300 with his or her right hand. The user's thumb 302 is on the right side 106 of the device 300 and in direct contact with the right side sensor 110. The user's first finger 304, or index finger, is on the top side 112 of the device 300 and in direct contact with the top side sensor 312. The user's second finger 306, third finger 308, and fourth finger 310 are all on the left side 116 of the device 300 and in direct contact with the left side sensor 118.

According to the example of FIG. 3B, the user is also holding the mobile computing device with his or her right hand. The user's thumb 302 is on the right side 106 of the device 300 and in direct contact with the right side sensor 110. But, the user's thumb 302 is closer to the bottom of the device than it is in FIG. 3A. The user's first finger 304 is on the back side of the device 300 and in direct contact with the back side sensor 120. The user's second finger 306, third finger 308, and fourth finger 310 are all on the left side 116 of the device 300. But, only the second finger 306 and the third finger 308 are in direct contact with the left side sensor 118. The fourth finger 310 is not in direct contact with the left side sensor 118.

The different appendage positions illustrated in FIGS. 3A and 3B may be used for various purposes. For example, specific appendage positions may be used to cause a particular application to perform a specific function. For example, in a communication application that involves a phone call, the position of FIG. 3A may indicate a standard mode of operation. The appendage position of FIG. 3B may indicate that the user wishes to mute the phone call. Thus, when the user switches from the appendage position of FIG. 3A to the appendage position of FIG. 3B, this signals to the communication application that is operating the phone call to mute the application.

The appendage positions may be used to signal other commands as well. For example, a user may be operating a web browsing application. The appendage position of FIG. 3A may indicate a standard operating mode. The appendage position of FIG. 3B, however, may be used to open a new tab in the browsing application. Thus, when the user switches from the appendage position of FIG. 3A to the appendage position of FIG. 3B, a command will be signaled to the web browsing application to open a new tab.

Other appendage positions besides the positions illustrated in FIGS. 3A and 3B may be used to signal various commands. Either individual finger placement or combinations of finger placements may be used to signal different commands. For example, different positions of only the index finger 304 may signal different commands to an application. Different positions of only the thumb 302 may signal different commands to an application. In some cases, combinations of thumb 302 and index finger 304 positions may signal different commands. In some examples, a change from one appendage position to another appendage position can signal specific commands.

In some cases, use of the sensors 110, 118, 120, 312 can eliminate the use of physical buttons on the mobile computing device. Rather, specific appendage positions or gestures can be used to perform the functions that physical buttons generally perform. For example, many mobile computing devices include physical buttons for volume control. Using principles described herein, a user may simply slide his or her finger along a certain portion of a side sensor 110, 118 to change the volume.

In some examples, the user may use fingers or thumbs from both hands to send commands to the mobile computing device. For example, the user may be holding the device with his or her right hand. All the fingers and the thumb of the right hand may be placed somewhere along a sensor of the device. Then, the user may use appendages of his or her right hand to touch the sensors, thereby signaling application specific commands.

Figure 4:
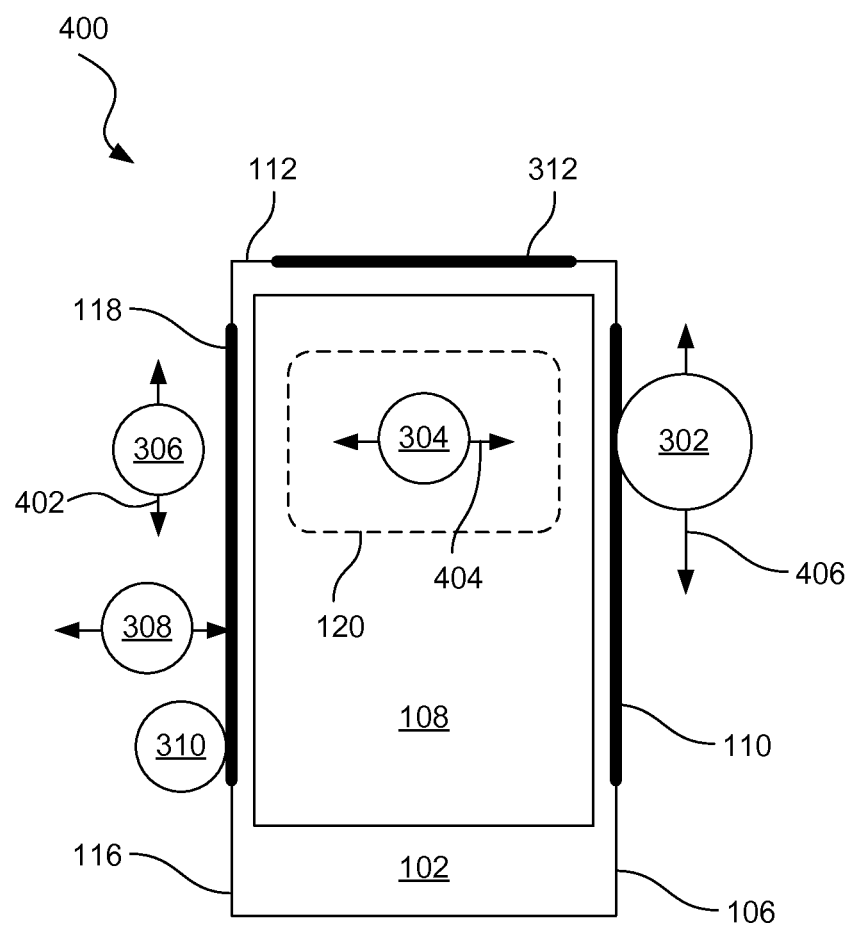
FIG. 4 is a diagram showing illustrative hand or finger motions that are detectable by sensors on the mobile computing device, according to one example of principles described herein.

FIG. 4 is a diagram showing illustrative hand or finger motions that are detectable by sensors on the mobile computing device. According to the present example, the mobile computing device 400 includes a left side sensor 118 on the left side 116 and a right side sensor 110 on the right side 106. The mobile computing device 400 also includes a back sensor 120 on the back side of the device. The mobile computing device 400 also includes a top sensor 312 on the top side 112 of the device. It is understood that the mobile device 400 illustrated in FIG. 4 is one example of a mobile computing device that can be used in accordance with principles described herein. Other configurations of mobile computing devices may be used as well.

In one example, the sensors 110, 118, 120, 312 can be used to sense motion. Different motions may signal different commands within a specific application. The sensors 110, 118, 120, 312 may be able to detect motion of a finger that is in direct contact with a sensor, or motion that is not in direct contact with the sensor. Such a distinction may be used to signal different commands to the application. For example, motion of a finger in contact with the left side sensor 118 may signal a different command then motion of a finger that is near, but not in direct contact with, the left side sensor 118.

According to the present example, the user moves his or her second finger 306, or middle finger, along the left side sensor 118 as indicates by the arrows 402. The user's finger is not in contact with the left side sensor 118, but the left side sensor 118 can still sense the user's finger 306 near the sensor. In one example, the left side sensor 118 is a capacitive sensor that is configured to detect fingers that are near, but not necessarily in contact with, the sensor.

According to the present example, the user moves his or her thumb 302 along the right side sensor 110. The thumb 302 is in direct contact with the right side sensor 110. The thumb 304 moves according to the arrows 406. Such movement can signal various commands to a particular application.

According to the present example, the user moves his or her thumb first finger 304, or index finger, along the back side sensor 120 in the direction of the arrows 404. In one example, the first finger 304 is in direct contact with the back side sensor 120. In some examples, the user's finger 304 may be near, but not in direct contact with, the back side sensor 120. In some cases, motion of the finger in direct contact with, or merely in proximity to the back side sensor 120 may signal the same command to the application. In some cases, however, the distinction between the finger 304 being in contact with, or merely in proximity to the backside sensor 120 may signal different commands to the application. This may be the case with the other sensors 110, 118, 120, 312 as well.

According to the present the user moves the third finger 308, or ring finger, in a motion that is perpendicular to the plane of the left side sensor 118. A capacitive sensor may be configured to detect approximate difference between the sensor 118 and an object such as a human hand or finger. In some examples, the sensor 118 can detect tapping. Thus, tapping may correspond to various commands.

The different sensors 110, 118, 120, 312 may be used to provide different commands to a particular application. For example, the mobile computing device 400 may run an information based application. An information based application refers to any application that presents information to a user in the form of a text, pictures, or video. One example of an information based application is a web browsing application. When running the web browsing application, movement along the left side sensor 402 may cause the web browsing application to scroll up and down. Movement along the top side sensor 312 or the back side sensor 304 may cause the web browsing application to scroll left and right. Movement along the right side sensor 110 may cause the web browsing application to zoom in and out. Other functions may be associated with specific gestures as well.

Figure 5:
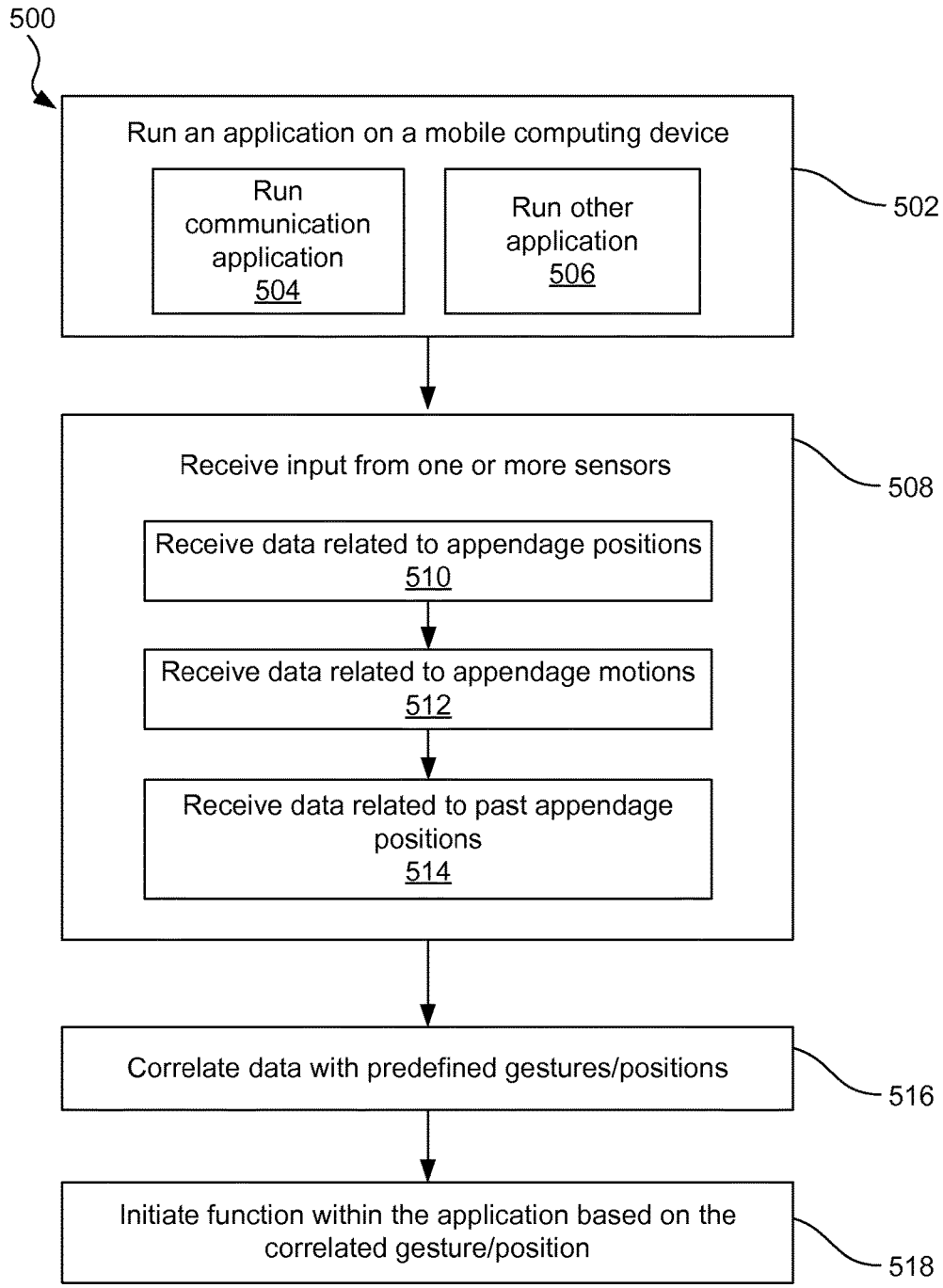
FIG. 5 is a flowchart showing an illustrative method for operating a mobile computing device with a sensor to detect appendage position and/or gestures, according to one example of principles described herein.

FIG. 5 is a flowchart showing an illustrative method for operating a mobile computing device with a sensor to detect appendage position and/or gestures. According to the present example, the method 500 includes a step 502 for running an application on the mobile computing device. In one example, running the application may include running 504 a communication application. A communication application includes a phone call application that is designed to transmit and receive audio data over a cellular phone network. Other communication applications may include chat or text based application. Running the application may also include running 506 an application that is not a communication application such as an information based application. As described above, an information based application may display information in the form of pictures, text, or video. One example of an information based application is a web browsing application. Another example of an information based application is a document reader application.

According to the present example, the method 500 includes a step for receiving input from one or more sensors. Such sensors may be placed on various sides of the mobile computing device as described above. As the user moves his or her fingers along or near the sensors, the sensors will produce electrical signals based on the position and gestures of the user's hand or fingers.

More specifically, at step 510, data related to appendage positions is received. Thus, the mobile computing device determines if the sensors are detecting any objects such as human fingers in contact with the sensors. The sensors may also be able to sense if there are objects such as human fingers near the sensors. The sensors will also provide data as to where along a sensor an object is being detected.

At step 512, data related to finger motions are received by the mobile computing device. Specifically, if the objects detected are in motion, then the sensors can detect that motion. In one example, the sensors can produce electrical signals indicating position at periodic time frames. This allows the mobile computing device to determine where the objects are along that time frame, and thus construct a motion trajectory.

At step 514 the mobile computing device receives data related to past appendage positions. Such data may be stored in general memory or a specific memory circuit designed for such purpose. Past appendage positions can be compared with present appendage positions to determine if a change in the way a user is holding the device has occurred.

At step 516, the received data is correlated with predefined positions or gestures. For example, a data structure may store a set of positions and gestures. For example, the positions may correspond to the manner in which a user is holding the mobile computing device and the gestures may correspond to hand or finger motions that are detectable by sensors on the mobile computing device. Each of those positions or gestures may be associated with a specific command. The command may be application specific. For example, the same appendage position or gesture may be associated with different commands in different applications.

At step 518 functions within the appropriate application are initiated based on the correlated command in the data structure. As described above, in the case of a communication application described above, the appendage positions or gestures may correspond to commands such as mute, turn on speakerphone, turn off speakerphone, change volume, terminate call, initiate recording of a call, initiate call, initiate call with a specific contact, and other commands that can be used with a communication application. In the case of an information based application, the appendage positions or gestures may correspond to commands such as scroll up or down, scroll left or right, zoom in or out, open new tab, close application, or any other application specific command.

Some examples of processing systems described herein may include non-transitory, tangible, machine readable media that include executable code that when run by one or more processors (e.g., processor 202) may cause the one or more processors to perform the processes of method 500 as described above. Some common forms of machine readable media that may include the processes of method 500 for example, floppy disk, flexible disk, hard disk, magnetic tape, any other magnetic medium, an optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A device comprising:
  a processor; and
  a memory comprising machine readable instructions that when executed by the processor, cause the device to:
    display information to a user through a display screen of the device, the display screen being positioned on a front side of the device;
    receive a first input from a first sensor placed on a left side of the device, the first input indicating a placement of at least one appendage along the first sensor;

receive a second input from a second sensor placed on a right side of the device, the second input indicating a placement of at least one appendage along the second sensor;

receive a third input from a third sensor placed on a top side of the device, the third input indicating a placement of at least one appendage along the third sensor;

receive a fourth input from a fourth sensor placed on a back side of the device, the fourth input indicating a placement of at least one appendage along the fourth sensor;

receive stored data corresponding to at least one past appendage position;

execute a predefined function within an application running on the device in response to determining, based on the first input, the second input, and the fourth input, that while one appendage is touching one of the first and second sensors and three appendages are touching the other of the first and second sensors, a fifth appendage moves along, in direct contact with, the fourth sensor, wherein the application running on the device is a web browsing application, wherein the predefined function comprises causing the web browsing application to scroll left and right; and execute a different predefined function within another application running on the device in response to determining, based on the first input, the second input, and the third input, that while the one appendage is touching the one of the first and second sensors and the three appendages are touching the other of the first and second sensors, the fifth appendage moves in proximity to, not in direct contact with, the third sensor, wherein the different predefined function comprises initiating recording of a call.

2. The device of claim 1, wherein the device is further to receive a fifth input from a fifth sensor on a bottom side of the device, the fifth input indicating a placement of at least one appendage along the bottom side.

3. The device of claim 2, wherein the predefined function is further based on the fifth input.

4. The device of claim 1, wherein the first sensor and the second sensor comprise capacitive sensors.

5. The device of claim 4, wherein the capacitive sensors are configured as proximity sensors.

6. The device of claim 1, wherein the device is further to receive a fifth input from at least one of the first sensor and the second sensor, the fifth input compared with the stored data to determine that a change in appendage position has occurred, the predefined function being further based on the change.

7. The device of claim 1, wherein:
the device is a communication device; and
the another application is a communication application.

8. The device of claim 1, wherein the device is further configured to receive a fifth input from at least one of the first sensor and the second sensor, the fifth input indicating motion of an appendage along at least one of the first sensor and the second sensor.

9. The device of claim 8, wherein the predefined function is further based on the fifth input.

10. The device of claim 1, wherein the device is further configured to receive a fifth input from at least one of the first sensor and the second sensor, the fifth input indicating contact from an appendage of a user hand that is not holding the device, the predefined function being further based on the fifth input.

11. The device of claim 1, wherein the third sensor detects the fifth appendage moving in proximity to the third sensor.

12. A mobile device comprising:
a display screen on a front side of the device;
a left side sensor on a left side of the device;
a right side sensor on a right side of the device;
a top side sensor on a top side of the device;
a back side sensor on a back side of the device;
a processor; and
a memory comprising machine readable instructions that when executed by the processor, cause the device to:
display information to a user through the display screen of the device;
receive a first input from the left side sensor, the first input indicating a placement of at least one appendage along the left side sensor;
receive a second input from the right side sensor, the second input indicating a placement of at least one appendage along the right side sensor;
receive a third input from the top side sensor, the third input indicating a placement of at least one appendage along the top side sensor;
receive a fourth input from the back side sensor, the fourth input indicating a placement of at least one appendage along the back side sensor;
receive stored data corresponding to at least one past appendage position;
execute a predefined function within an application running on the device in response to determining, based on the first input, second input, and fourth input, that while one appendage is touching one of the left side and right side sensors and three appendages are touching the other of the left side and right side sensors, a fifth appendage moves along, in direct contact with, the back side sensor, wherein the application running on the device is a web browsing application, wherein the predefined function comprises causing the web browsing application to scroll left and right; and
execute a different predefined function within another application running on the device in response to determining, based on the first input, the second input, and the third input, that while the one appendage is touching the one of the left side and right side sensors and the three appendages are touching the other of the left side and right side sensors, the fifth appendage moves in proximity to, not in direct contact with, the top side sensor, wherein the different predefined function comprises initiating recording of a call.

13. The device of claim 12, wherein the machine readable instructions are further to cause the device to initiate a phone call.

14. The device of claim 13, wherein the machine readable instructions are further to cause the device to:
receive a fifth input from at least one of the left side sensor and the right side sensor, the fifth input corresponding to a gesture made by a user; and
execute a second function within the application, the second function being based on the gesture.

15. The device of claim 14, wherein the gesture comprises one of: tapping the sensor with one finger, tapping the sensor with more than one finger, sliding one finger along the sensor, sliding more than one finger along the sensor, and waving a finger in proximity of the sensor.

16. A method performed by a mobile computing device, the method comprising:

receiving a first input from a first sensor placed on a left side of the device, the first input indicating a placement of at least one appendage along the first sensor;

receiving a second input from a second sensor placed on a right side of the device, the second input indicating a placement of at least one appendage along the second sensor;

receiving a third input from a third sensor placed on a top side of the device, the third input indicating a placement of at least one appendage along the third sensor;

receiving a fourth input from a fourth sensor placed on a back side of the device, the fourth input indicating a placement of at least one appendage along the fourth sensor;

receiving stored data corresponding to at least one appendage position;

executing a predefined function within an application running on the device in response to determining that while three appendages are touching one of the first and second sensors and a fourth appendage is touching the other of the first and second sensors, a fifth appendage moves along, in direct contact with, the fourth sensor, wherein the application running on the device is a web browsing application, wherein the predefined function comprises causing the web browsing application to scroll left and right; and executing a different predefined function within another application running on the device in response to determining that while the three appendages are touching the one of the first and second sensors and the fourth appendage is touching the other of the first and second sensors, the fifth appendage moves in proximity to, not in direct contact with, the third sensor, wherein the different predefined function comprises initiating recording of a call.

17. The method of claim 16, further comprising, receiving a fifth input from at least one of the first sensor and the second sensor, the fifth input indicating a gesture made by an appendage, the predefined function being further based on the fifth input.

* * * * *